United States Patent [19]
Bae

[11] Patent Number: 5,471,238
[45] Date of Patent: Nov. 28, 1995

[54] UNIT FOR TRANSFERRING IMAGES ON FILM ONTO VIDEOTAPE MOUNTED IN A VIDEO CAMERA WITH SYNCHRONOUS SOUND RECORDING

[75] Inventor: Jong-Chan Bae, Seoul, Rep. of Korea

[73] Assignee: Dongyang Jonghap Corporation, Chungchong Pukdo, Rep. of Korea

[21] Appl. No.: 959,913

[22] Filed: Oct. 13, 1992

[30] Foreign Application Priority Data

Oct. 12, 1991 [KR] Rep. of Korea ............... 16979/1991

[51] Int. Cl.⁶ ................................................. H04N 5/253
[52] U.S. Cl. ........................... 348/98; 348/97; 348/207; 348/373
[58] Field of Search ................................ 358/214, 229, 358/54; 359/889, 890, 891, 892; 355/74; 354/81, 293; 248/166, 188.6; 348/97, 373, 374, 375, 98, 207; H04N 3/36, 5/253, 5/30, 9/11

[56] References Cited

U.S. PATENT DOCUMENTS

| | | | |
|---|---|---|---|
| 4,516,171 | 5/1985 | Yamazaki | 358/214 |
| 4,868,661 | 9/1989 | Takahashi | 358/185 |
| 5,003,379 | 3/1991 | Moore, Jr. et al. | 358/54 |
| 5,033,820 | 7/1991 | Hama | 350/315 |
| 5,055,863 | 10/1991 | Lindenfelser | 354/75 |
| 5,099,359 | 3/1992 | Hrycin et al. | 359/587 |
| 5,132,804 | 7/1992 | Takahashi | 358/226 |
| 5,160,948 | 11/1992 | Bae | 358/54 |

OTHER PUBLICATIONS

World of Video Innovations—AMBICO Spring 1989 Catalog.

Primary Examiner—Joseph Mancuso
Assistant Examiner—Tuan V. Ho
Attorney, Agent, or Firm—Foley & Lardner

[57] ABSTRACT

A film-to-tape transfer apparatus transfers and records images of movie film, slide film and photographs onto videotape mounted in the video camera with synchronous sound recording by providing a control panel on the body of the apparatus to control both audio and video signals to be transferred. Different sizes of photographs can be mounted on the photo mount. Recording can be made either in black and white or in color.

3 Claims, 9 Drawing Sheets

UNIT FOR TRANSFERRING IMAGES ON FILM ONTO VIDEOTAPE MOUNTED IN A VIDEO CAMERA WITH SYNCHRONOUS SOUND RECORDING

BACKGROUND OF THE INVENTION

The present invention relates to a film-to-tape transfer apparatus of the type which is suitable for transfering and recording images from movie film, slide film and photographs onto videotape mounted in a video camera with synchronous sound recording.

In the past, the role of a conventional film-to-tape transfer apparatus was to transfer and record only the images or photographs on film or photographs onto videotape. Accordingly, in order to record sound onto the videotape, the images on the film or photograph had to be first transferred and recorded on the videotape, after which sound was mixed, edited and recorded on the videotape. This two-step transferring process of the conventional transfer apparatus is not only time-consuming but also troublesome from the standpoint of achieving accurate synchronism between the image recording and the sound recording. Furthermore, the quality of the audio and video recordings on the finished videotape product is only of sufficient quality as to allow only playback of the videotape since any further duplication of the videotape recorded by such conventional apparatus produces inferior copies not suitable for playback.

Another disadvantage of the conventional transfer apparatus is that each light filter has to be mounted and removed one by one as required. Moreover, the size of photographs was limited to those that could only be inserted into the gap formed between the pushing plate and the transparent glass of the transfer apparatus. Additionally, the height of the case body of the conventional transfer apparatus is not adjustable.

SUMMARY OF THE INVENTION

An object of the present invention is to overcome the above-mentioned shortcomings and problems of the conventional transfer apparatus by providing a film-to-tape transfer apparatus which can easily record the images of movie film, slide film and photographs onto videotape mounted in a video camera with synchronous sound recording. The treble and bass tones of the sound recording are adjustable and audio mixing is also featured.

Another object of the present invention is to provide a film-to-tape transfer apparatus whereby synchronous audio-video recordings can be promptly and easily made either in black and white or in color, selectively, by using a plurality of filters loaded in a single filter case, on two sets of video cameras using two microphones.

It is still another object of the present invention to provide a film-to-tape transfer apparatus wherein photographs of different sizes and dimensions can be mounted on the photo mount.

It is a further object of the present invention to provide a base unit for the case body of the film-to-tape transfer apparatus wherein the base unit has two folding legs with which the height of the transfer apparatus can be adjusted to the desired level.

To achieve the objects and in accordance with the purpose of the invention, as embodied and broadly described herein, the present invention is directed to a film-to-tape transfer apparatus comprising a case body having a lens mount and a photo mount, a control panel disposed on a side of the case body, for controlling input audio and video signals to be transferred, a filter case aperture forming a hollow aperture through the lens mount, and means for adjusting a size of an image to be transferred to the videotape in accordance with a size of an image on the film. The film-to-tape transfer apparatus further comprises a pair of folding legs on an underside of the case body. The film-to-tape transfer apparatus may further comprise a pair of blocking protrusions on the underside of the case body, and a pair of auxiliary protrusions on the underside of the case body, wherein the blocking and auxiliary protrusions prevent the folding legs from being unfolded beyond a blocked position. The film-to-tape transfer apparatus of the present invention may also be used with a filter case loaded with a plurality of filters that are insertable in the filter case aperture. The photo mount may comprise a support case and a piece of transparent glass attached to said support case. The support case may comprise an inner plate having a plurality of guide grooves, a plurality of concave guides to which the inner plate is fixedly secured, a control knob attached to the guide grooves, a pair of margin bars actuated by the control knob, and a pair of carriages having rocks, protruded scales provided on the rear of the margin bars, and a pair of guide rods which move the carriages left and right simultaneously by means of a pinion.

The support case may further comprise an elevation support member on the concave guides, an elevation plate behind the elevation support member having the protruded scale, an elevating knob held by the guide rods, and a pair of scale windows formed horizontally and vertically on a rear side of the photo mount.

The film-to-tape transfer apparatus may further include a reflection mirror unit comprising a semi-circle guide groove formed on one side of the case body, and a support member having a control lever having a semi-circle guide tongue in contact with the semi-circle guide groove.

The film-to-tape transfer apparatus of the present invention may further comprise a fixing plate having a resilient tongue of an inverted U-shape protrusion formed upward, wherein the fixing plate is fixedly secured to the support member, and a plurality of control protrusions on the semi-circle guide groove.

The film-to-tape transfer apparatus of the present invention may further comprise a control panel on the case body comprising a master switch, a music switch, a microphone switch, an audio switch, a brightness control switch, a video selection switch, a color selection switch a lamp switch, and a power switch.

The present film-to-tape transfer apparatus may further comprise a color selection switch suppressing a color burst signal, resulting in the transfer of a black and white image.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DETAILED DESCRIPTION OF THE PREFERRED EMBODIMENTS

A preferred embodiment of the present invention will now be explained in detail in conjunction with the drawings.

Figure 1:
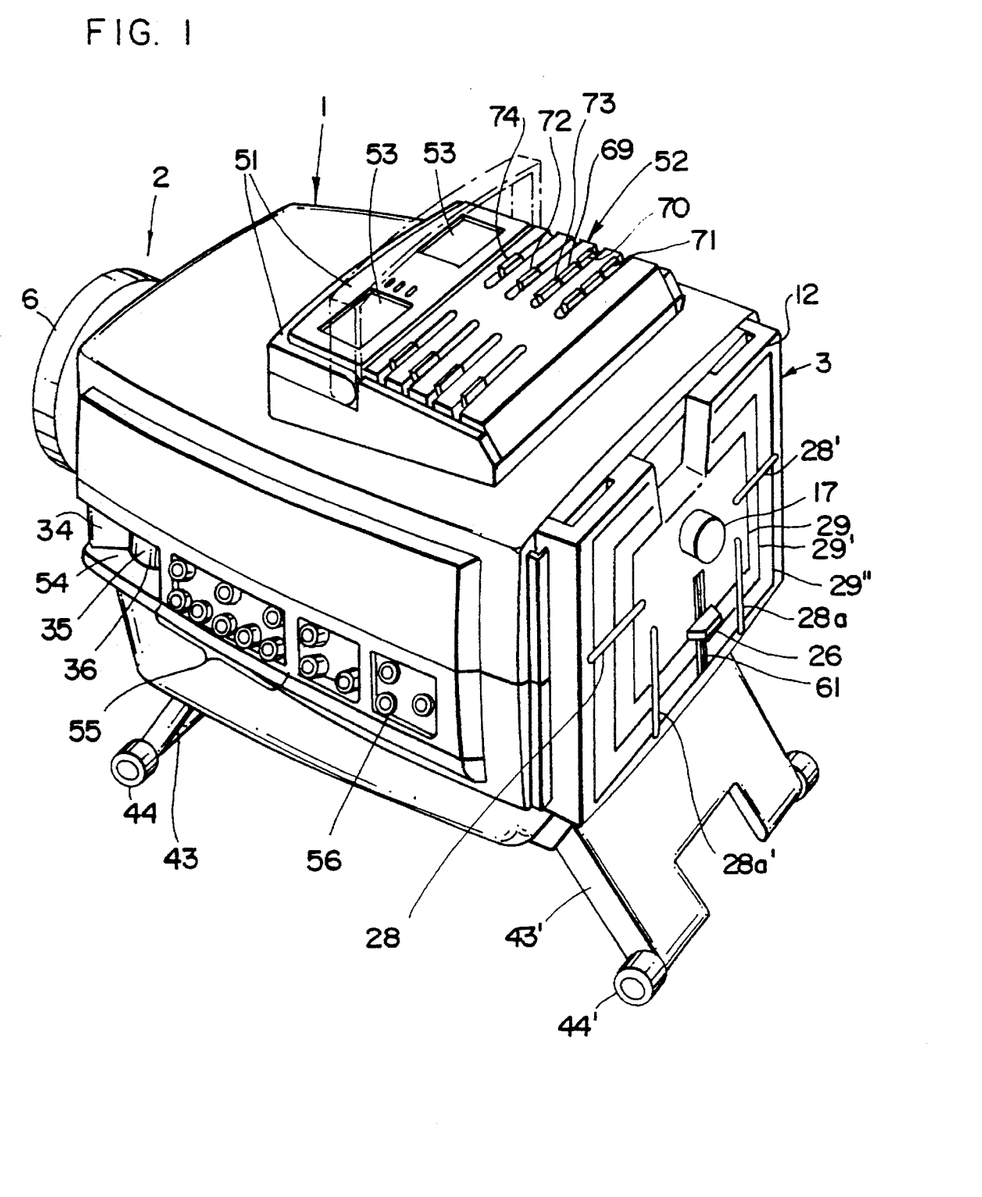
FIG. 1 is a perspective view of a film-to-tape transfer apparatus according to a preferred embodiment of the present invention.

Referring first to FIG. 1, there is shown a film-to-tape transfer apparatus in a perspective view.

A case body 1 of the transfer apparatus is provided with a lens mount 2 in the front side, a photograph mount 3 in the rear side and a glass screen mount 4 on one side to record the images of movie film, slide film and photograph and the like onto videotape.

On one side of the upper portion of the case body 1 is disposed a plurality of controllers. These controllers include a master controller 75 for adjusting the integrated audio-video signal, a music controller 76 for adjusting the music player, a microphone controller 77 for adjusting the sound when recording the sound in stereo through both a left and a right microphone and an audio controller 78 for adjusting the level of audio sound.

On the other side of the upper portion of the case body 1 is disposed a plurality of switches 52. The switches 52 include a volume switch 74, brightness control switch 72, video option switch 73, color option switch 69, a lamp switch 70, and a power switch 71. A plurality of jacks 55 are disposed at one side of the case body 1.

Figure 3:
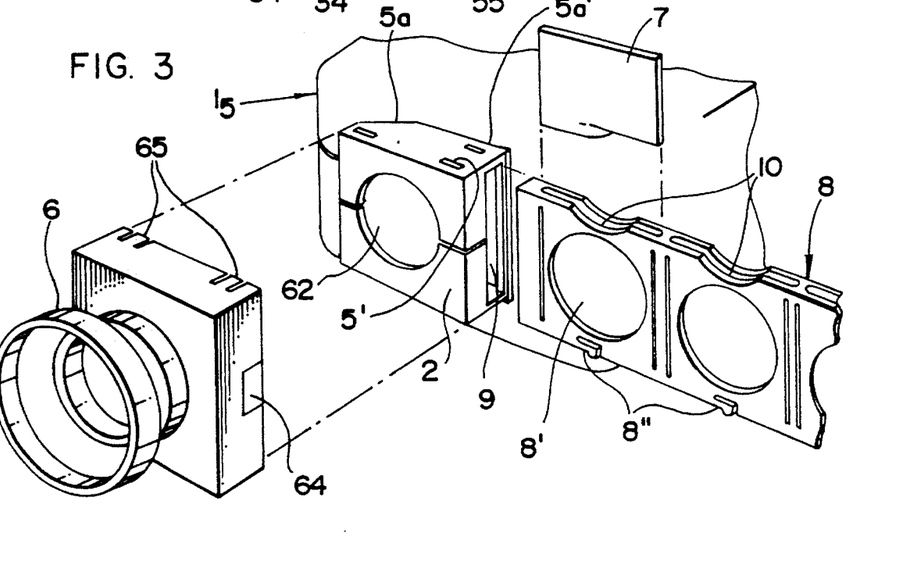
FIG. 3 is an exploded perspective view of a lens mount unit for the film-to-tape transfer apparatus shown in FIG. 1.
Figure 4A:
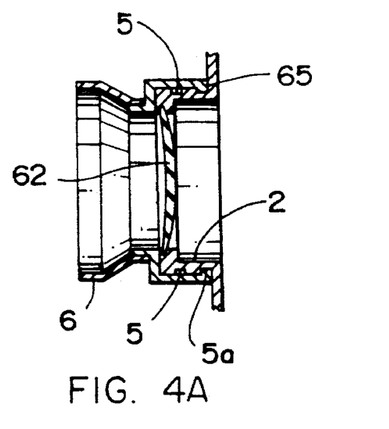
FIG. 4a is a side, elevational, cross-sectional view of the lens mount unit shown with a filter case according to the present invention.
Figure 4B:
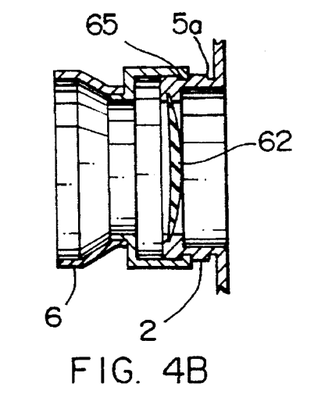
FIG. 4b is a sectional view of a lens mount unit shown without a filter case according to the present invention.
Figure 5:
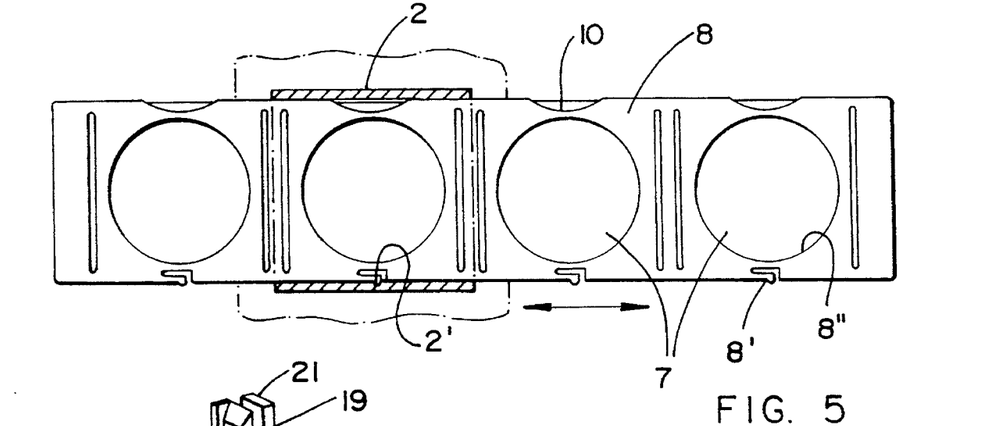
FIG. 5 is a front, elevational, cross-sectional view showing the filters in the filter case as used in the transfer unit of the present invention.

On the lens mount 2, two pairs of recesses 5, 5', 5a, and 5a' shown in FIG. 3, are formed in a row on the upper and lower frames so as to permit a lens hood 6 to be inserted and secured.

Figure 2:
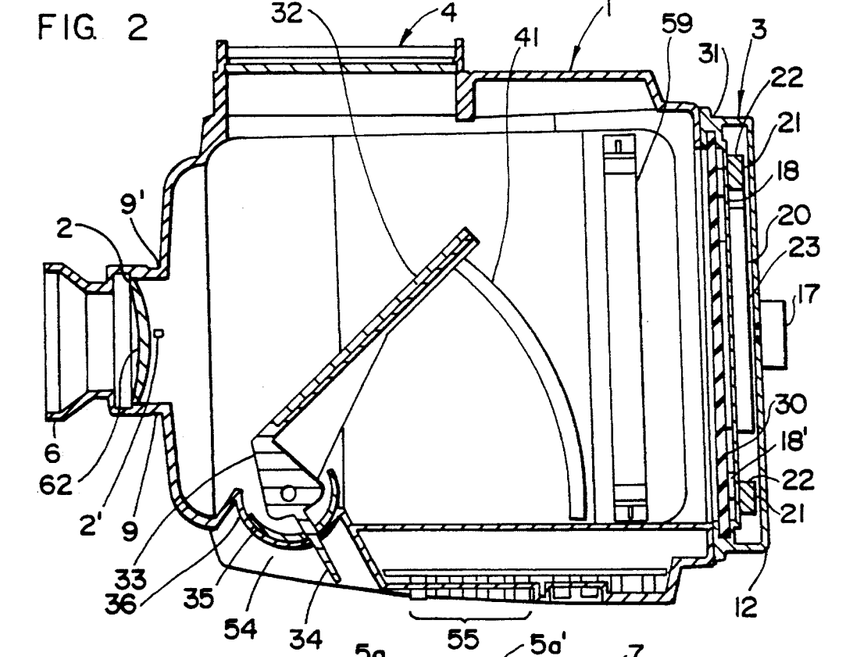
FIG. 2 is a side, elevational, cross-sectional view showing the transfer construction of the film-to-tape transfer apparatus shown in FIG. 1.

Referring to FIG. 2 and FIG. 3, on the inside of the lens mount 2 where a concave groove 2' is formed, a pair of oblong apertures 9 and 9' are formed on both side frames so as to permit a filter case 8 to be inserted through both apertures 9 and 9'. Referring to FIG. 3, the filter case 8 is designed to load a plurality of different types of filters 7 by providing a plurality of hollows 8" the diameter of each of which corresponds to that of the macro lens.

Along the upper peripheral edge of the filter case 8, a plurality of concave U shaped indentations 10 are formed, and along the lower peripheral edge of the filter case 8, a plurality of resilient L-shaped tongues 8' are formed.

Figure 6:
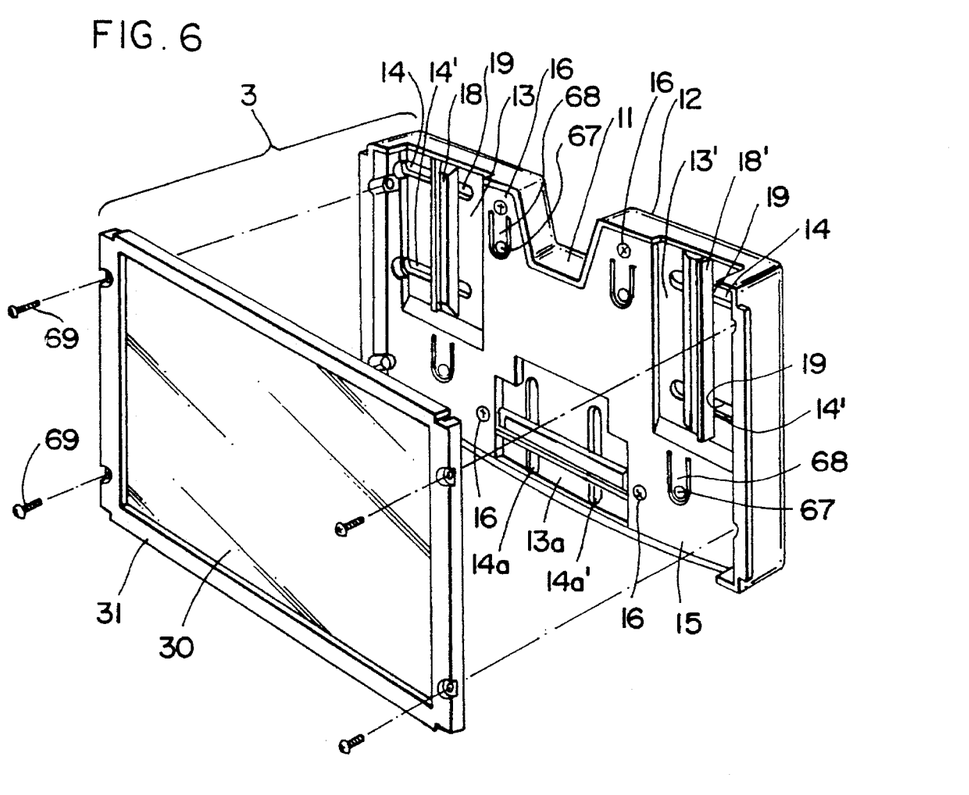
FIG. 6 is an exploded, perspective view of a photograph mount unit according to the present invention.

Referring to FIG. 6, the photo mount 3 is detachably engaged with the case body 1, and the support case 12 has a U-shaped concave indentation 11 formed at the center of the upper peripheral edge. On the inner side portion of the photo mount 3, there are formed a plurality of concave guides 13, 13' and 13a, and an inner plate 15 having a plurality of oblong guide apertures 14, 14', 14a, and 14b is fixedly inserted and secured by screws 16.

Figure 7:
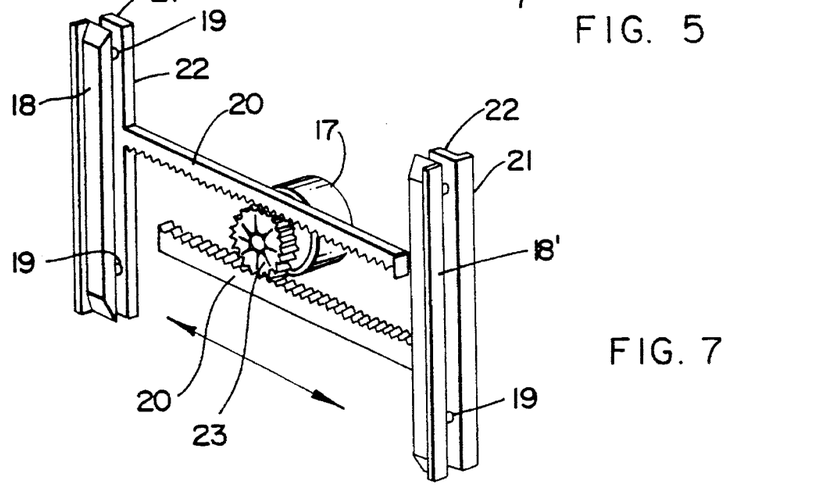
FIG. 7 is an enlarged, fragmentary, perspective view of the photograph mount mechanism according to the present invention.

Provided on the concave guides 13, 13' are a pair of horizontally moving margin bars 18 and 18' operated by a control knob 17, shown in FIG. 7. The margin bars 18 and 18' are connected to a pair of carriages 22 having a rack 20 and a protruded scale 21 secured by a pair of guide rods 19 on each side. As the control knob 17 is actuated, the carriages 22, by means of a pinion 20 and the racks 20 of the carriages engaged therewith, move towards both the left and right sides simultaneously and vice versa.

Figures 9, 10, 11, 12:
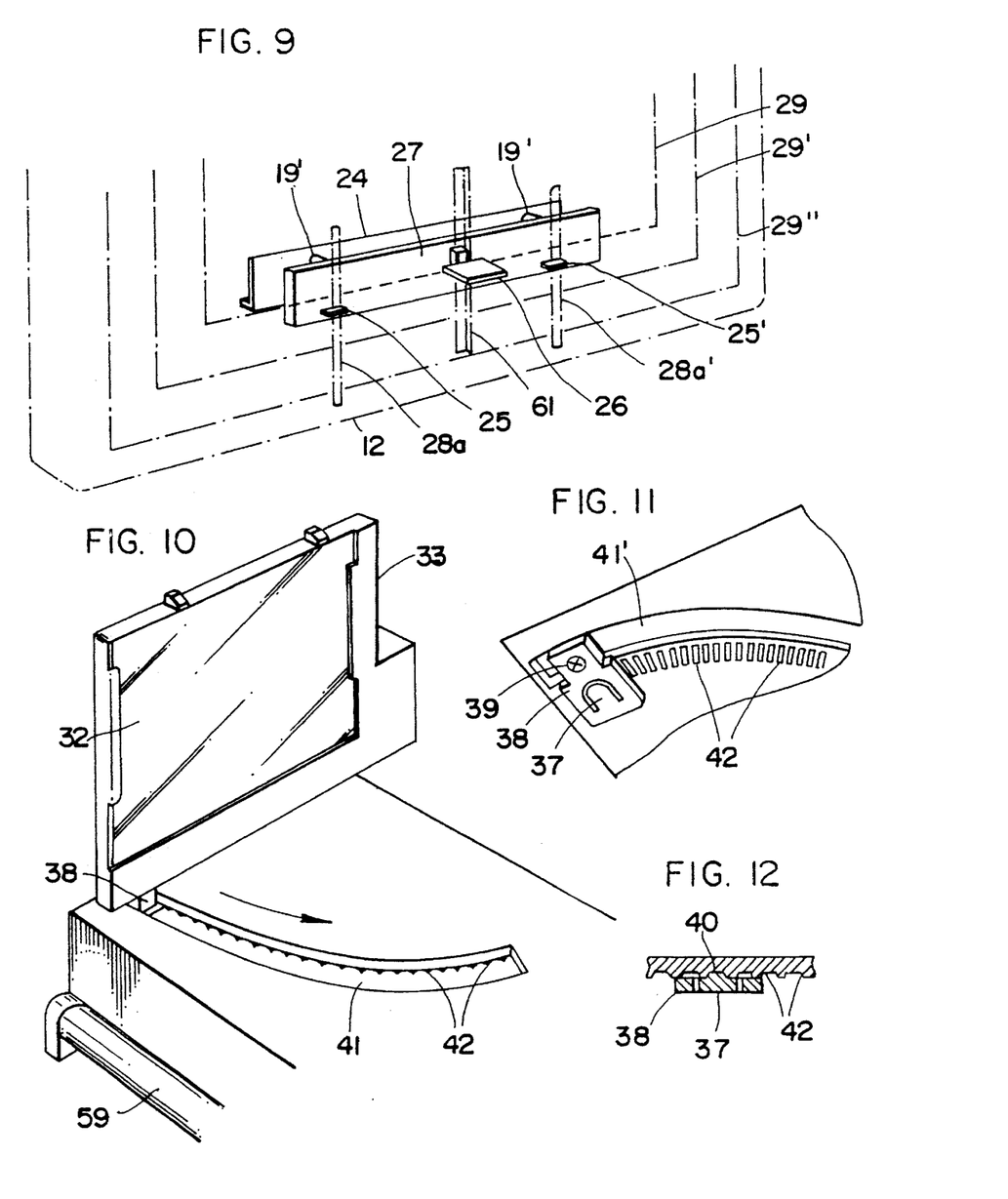
FIG. 9 is a fragmentary, perspective view of the photograph mount unit showing the mechanism for adjusting the height of the photograph to be recorded.
FIG. 10 is an enlarged, perspective view of a reflective mirror unit used in the present transfer unit.
FIG. 11 is a fragmentary, plan view of the mount for the reflective mirror unit.
FIG. 12 is a side, elevational, cross-sectional view of the mount shown in FIG. 11.

As shown in FIG. 9, there is also provided on the concave guides 13 and 13' an elevation support member 24 which, by a pair of guiding rods 19', is connected to an elevating plate 27 having protruding scales 25, 25' and an elevating knob 26.

On the rear side of the photo mount 12, scale windows 28, 28', 28a, and 28a' are formed at both sides and lower portions of the photo mount support case 12 to which a support member 31 having a transparent glass sheet 30 in the front is secured by screws 69, as shown in FIGS. 1 and 6.

In the interior of the case body 1, a supporting frame 33 having a reflective mirror 32 is fixedly inserted, as shown in FIG. 2.

At one end of the support frame 33, an operating knob 34 having guide piece 35 is formed so as to permit its operation when the guide piece 35 contacts with a semi-circle guide aperture 36.

On the other side of lower portion of the supporting frame 33, a setting member 38 having an inverted U-shape resilient piece 37 is tightly secured with a bolt 39, as shown in FIG. 11.

On the upper side of the resilient piece 37, a protrusion 40 is formed so as to operate by engagement with the control protrusions 42 formed below the semi-circle shape guiding aperture 41 shown in FIGS. 11 and 12.

Figure 13:
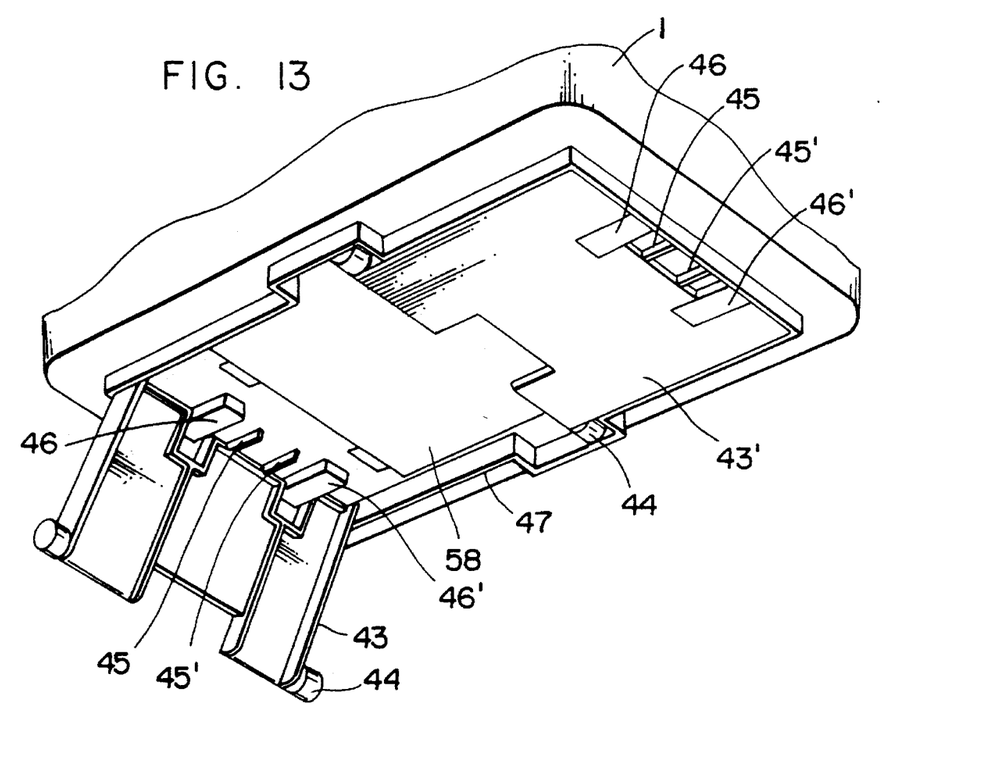
FIG. 13 is a fragmentary, bottom, perspective view of the transfer unit of the present invention.
Figure 14:
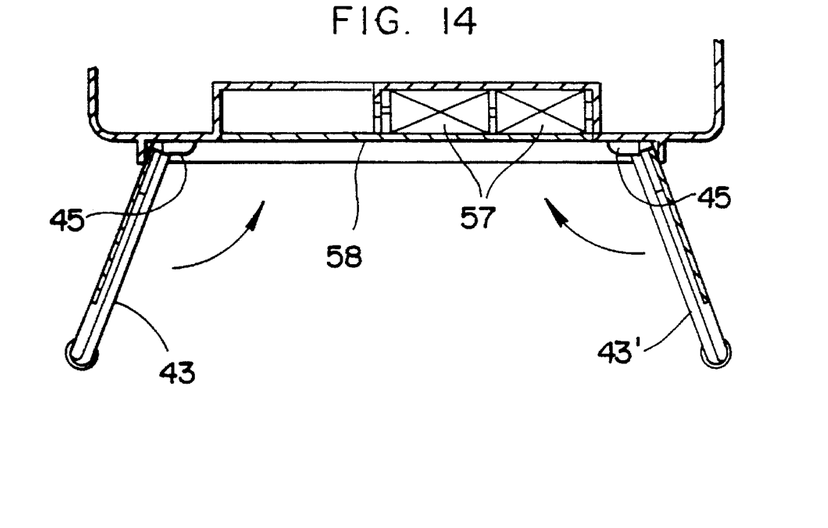
FIG. 14 is a fragmentary, elevational, cross-sectional view of the bottom portion of the transfer unit of the present invention.

Two pairs of folding legs 43 and 43' are provided at the front and rear ends on the bottom of the case body 1, to each of which a rubber packing 44 is fitted, as shown in FIGS. 13 and 14.

Between each pair of legs is formed a pair of blocking protrusions 45 and 45' and auxiliary protrusions 46 and 46' surrounded by a peripheral wall 47.

Figure 8:
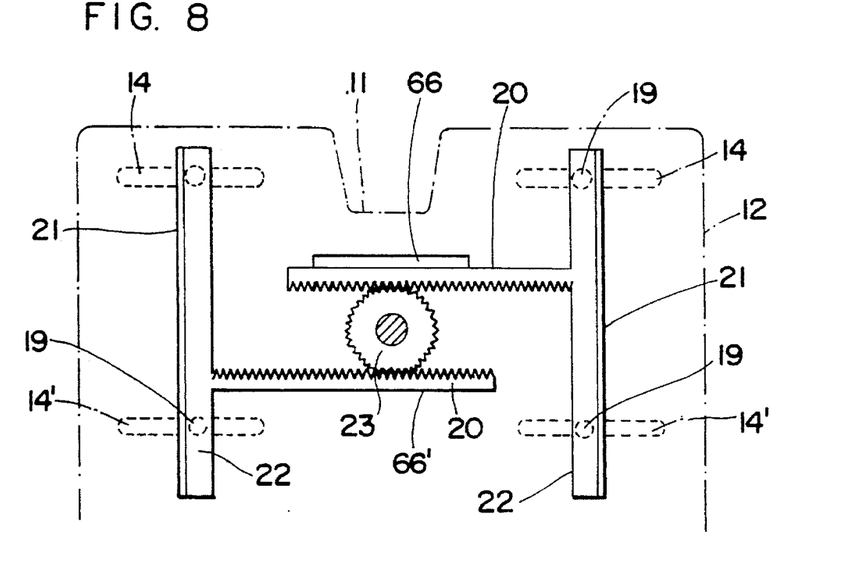
FIG. 8 is a fragmentary, elevational view of the photograph mount unit showing the photograph mount mechanism that adjusts to the size of the photograph to be recorded.

In the accompanying drawings, reference numerals designated at 51 is a carrying handle, 53 and 53' are visual gauges, 54 is a concave indentation, 55 is a plurality of video jacks, 56 is a microphone jack and 61 is a guiding groove as shown in FIG. 1. A battery compartment cover 58 covers battery compartment 57 as shown in FIG. 14. A fluorescent lamp 59 and a reflecting mirror support member 33 and a macro lens 62 are shown in FIG. 2. A finger groove 64 and a pair of blocking plates 65 are shown in FIG. 3, and a pair of guide protrusions 66 and 66' are shown in FIG. 8. A pressing protrusion 67 and a resilient piece 68 are shown in FIG. 6.

The operation of the circuits of FIG. 15A–15D will now be described.

Figure 15A:
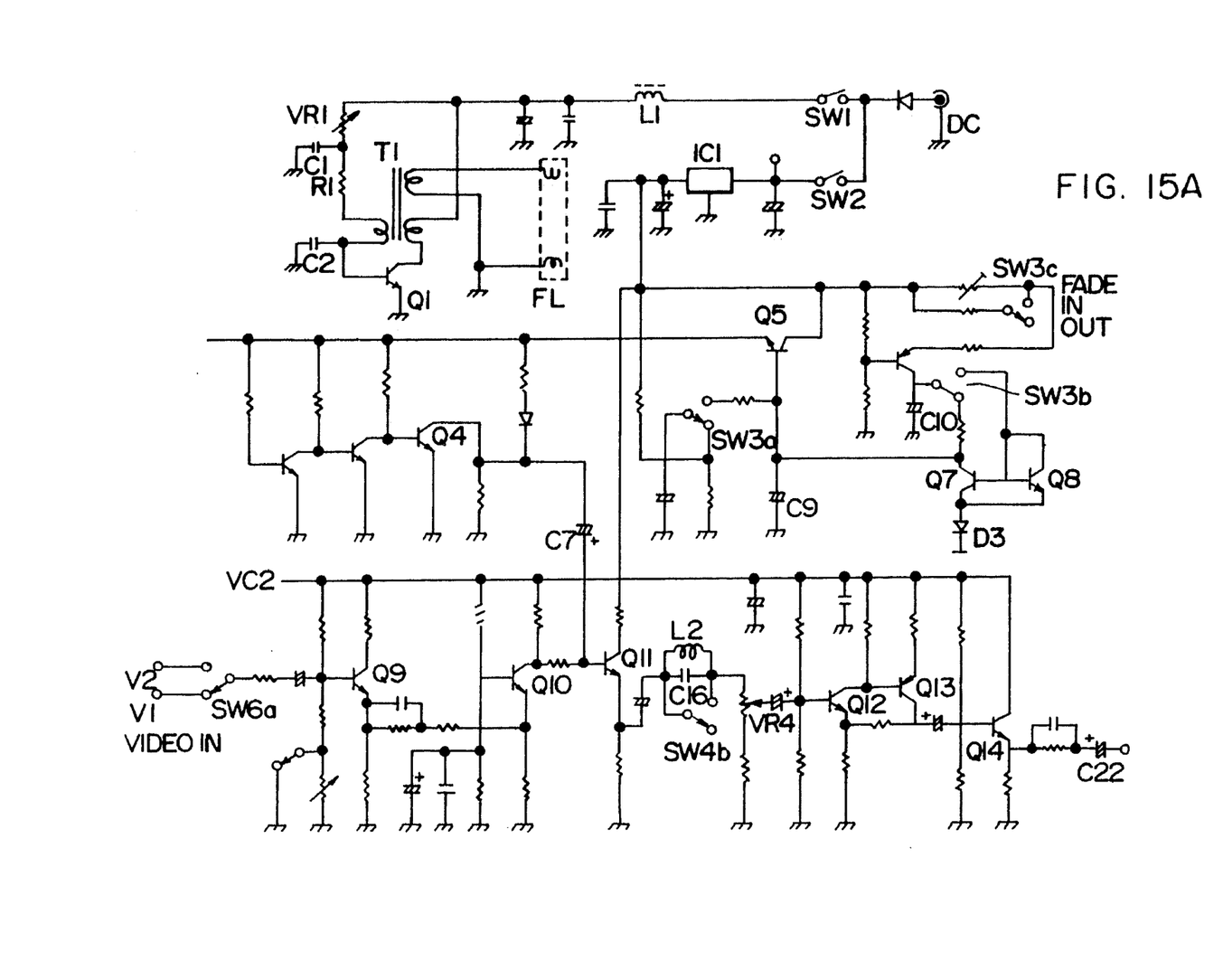
FIGS. 15A–15D are electric circuit diagrams for controlling a film-to-tape transfer apparatus of the present invention, and 15A illustrates the power, video and audio circuit; 15B illustrates the music circuit; 15C illustrates the audio circuit; and 15D illustrates the monitor circuit.
Figure 15B:
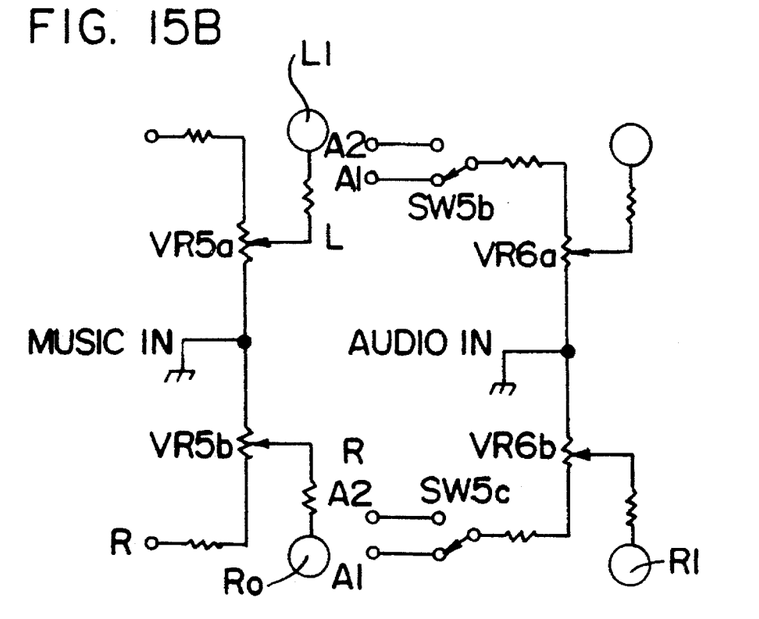

In the drawings of the circuit diagrams, reference code DC is a direct current jack which is connected to an adapter (not shown) of 6-volt direct current, 700 milliampere, and supplies electric power to the various circuits.

The electric power supplied via a power switch SW1 to the jack is connected to the terminal of a primary winding of choke coil (L1) and a transmitter (T1) while the other terminal is connected to the base of a transistor (Q1) having a grounded emitter. The collector of the transistor (Q1) is connected to the power source through the secondary winding of the transmitter (T1). The third winding is connected to the electrode of a fluorescent lamp (FL), previously indicated at 59 in FIG. 2.

When the switch (SW1) is turned on via switch 71, the oscillation by a variable resistor VR-1, a resistor R1, and capacitors C1 and C2 which are connected to the terminal of a primary winding of a transformer results in a high frequency current being supplied to the second winding. The high frequency current supplied to the third winding turns the fluorescent lamp on.

Furthermore, by turning switch SW2 on, constant current can be supplied to a circuit (explained below) by the constant voltage circuit IC1.

Video signals V1 and V2 are selected by the interacting channel selector switch SW6a and input through switch 73. This selection is indicated on the luminous diode LD1 and LD2 shown in FIG. 15D. Switches SW5b and SW5c select audio signals A1 and A2, shown in FIG. 15B. In other words, the audio signal impressed upon the selected video signal V1 or V2 is selected by the interacting channel selector switch SW6a is in turn impressed on and amplified by the base of the transistor Q9 and further amplified by the transistors Q10 and Q11 and the image signal is increased or decreased by the variable resister VR4, and after amplified by transistors Q12, Q13, and Q14 image signal is output through the capacitor C22.

On the other hand, fade switches SW3a, SW3b, and SW3c are made to interact so that when signals are input from 72 the electric energy stored in the capacitor C10 is discharged by a transistor Q8 and a diode D3 to maintain the transistor's Q5 emitter power at zero, thereby preventing the flow of transistor's Q4 collector current and subsequent decrease of signal by a capacitor C7, enabling the output image signal to be normal.

When the fade switches are turned off, the base of transistor becomes open, permitting capacitor C10 to be recharged. The electric energy recharged in such a manner recharges the capacitor C9 and, with the recharged voltage, increases the emitter voltage of the transistor Q5 and supplies collector power to the transistor Q4.

As the collector current flows through the transistor Q4 in this manner the image signal received by transistor Q11 base becomes reduced as the image signal flows into transistor Q4 by the capacitor C7 the output of the image signal is reduced and the picture gradually fades away.

Figure 15C:
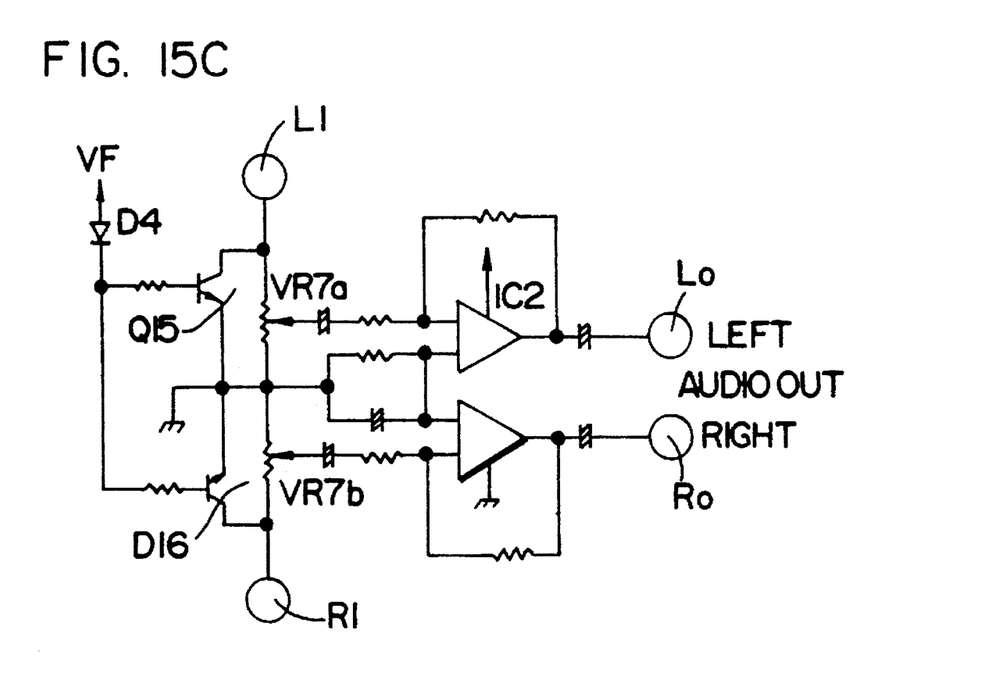
Figure 15D:
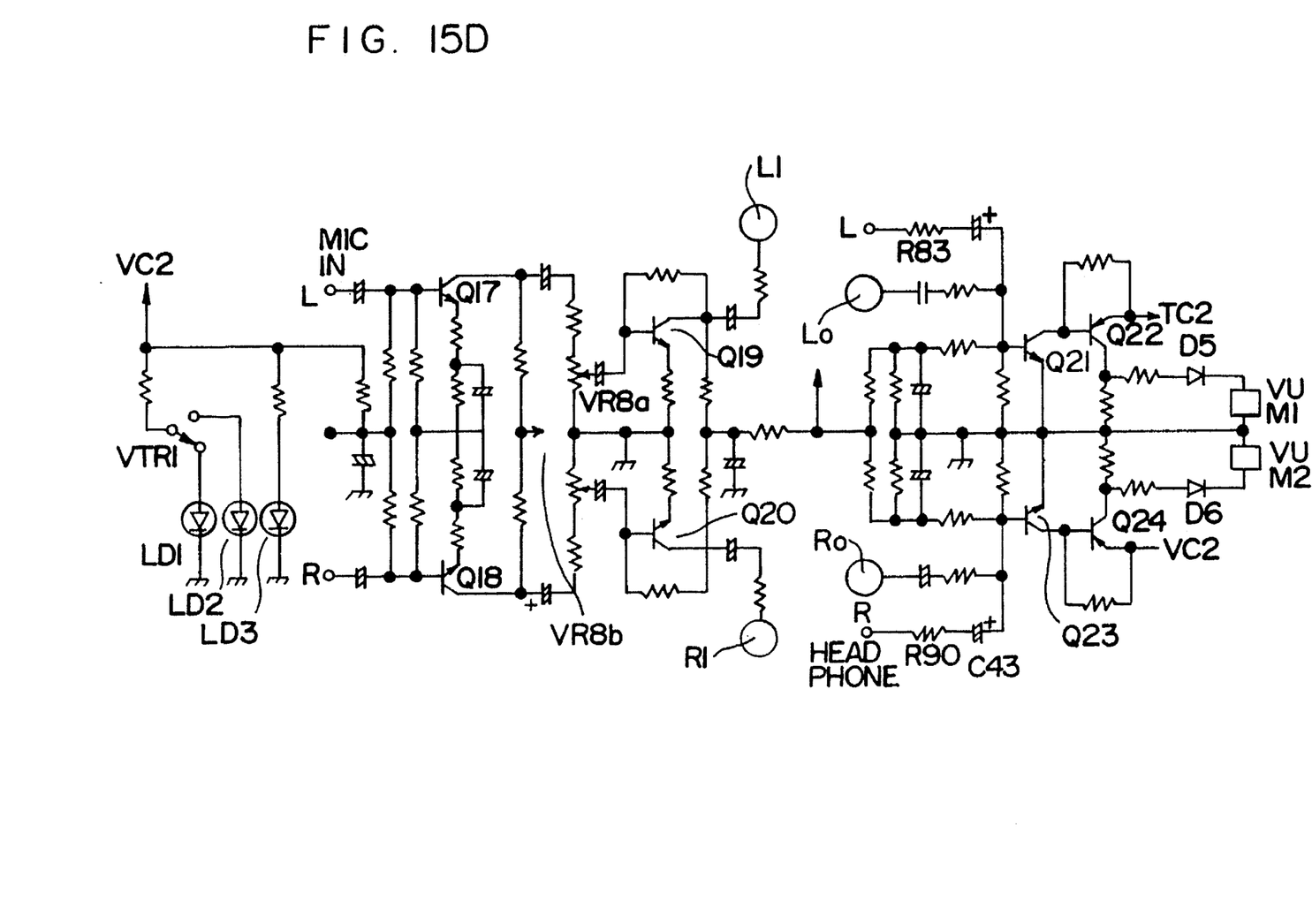

The interacting channel selector switch VTR1 selectively illuminates the luminous diode LD1 and LD2 so as to indicate which video signal has been selected as shown in FIG. 15D.

On the other hand, signals of the left and right microphones are amplified by the respective transistors Q17 and Q18 while the signals adjusted by the variable resistors VR8A and VR8b, connected to controller 76 are amplified by the respective transistors Q19 and Q20 and adjusted by the other variable resistors VR7a and VR7b.

The music signal, after being adjusted by variable resistors VR5a and VR5b, is added to the variable resistance VR7a and VR7b. For recording audio on the videotape, the audio signals are adjusted by the variable resistors VR6a and VR6b and are supplied to the variable resistors VR7a and VR7b.

Hence, the variable resistors VR7a and VR7b shown in FIG. 15C are the master control 75 and play the role of regulating the final sound volume for all signals, and the audio signals adjusted by said variable resistors VR7a and VR7b are amplified and supplied to output terminals LO and RO.

During a picture fadeout, using the interacting fade out switches SW3a, SW3b, and SW3c, the fade voltage is impressed on the base of transistors Q15 and Q16 by the diode D4 and is turned on and reduces the sound signal of variable resistors VR7a and VR7b; both left and right sound outputs can be monitored by means of a headphone through a resistor R83, a capacitor C40, a resistor R90, and a capacitor C45. Furthermore, the left and right signals are amplified into transistors Q21 and Q22 and to the other transistors Q23 and Q24 and through the respective diodes P5 and P6 connected to gauges VUM1 and VUM2 so that sound volume could be monitored.

During editing of the videotape, interacting switch SW4b, input via color switch 69, could be utilized. For example, when the switch SW4b is open, a conducting coil L2 and a capacitor C16 would trap a color burst signal, thereby interrupting the color burst signal being fed to a transistor Q12, thus making the projected image in black and white. Conversely, when the switch SW4b is closed, the color burst signal would be fed to the transistor Q12, making the projected image be in color.

When a photograph, movie film or slide to be recorded is inserted into the video camera, the direction of reflecting mirror 32 is selected according to the subject material to be recorded by angular rotation of the manipulating knob 34 as shown in FIG. 2.

When a photograph is to be recorded using the video camera, the power switch is turned on and the manipulating knob 4 is actuated to rotate the reflecting mirror 32 to the inside wall of the case body 1. The video camera is abutted on the macro lens, and the photograph is inserted into the photo mount 3, thus recording the photograph with music and sound on the videotape mounted in the video camera.

The position of the photo mount 3 is adjusted according to the size of the photograph to be recorded by adjusting it with a control knob 17 and an elevation knob 26.

When the control knob 17 is actuated to rotate a pinion 23 disposed on the same shaft, it causes the rack gears 20 to which carriers 21 and 22 are fitted to move in opposite directions as shown in FIG. 7. With the movement of the carriers 21 and 22, the adjusting frames 18 and 18' connected thereto move to adjust to the size of the photograph as ascertained by checking the scales 28 and 28' perforated on the back side of the support case 12 and size indicators 29, 29' and 29'' shown in FIG. 9.

By adjusting the elevation knob 26, the elevation support frame 24 fixedly attached to the elevation plate 27 can be adjusted up and down until it reaches the desired level of height which also can be ascertained by checking the scales 28a and 28a' perforated on the back side of the support case 12 and the size indicators 29, 29' and 29''.

When movie film or slide film is to be recorded on videotape, the manipulating knob 34 is actuated to rotate the reflecting mirror 32 to the correct position where the reflecting mirror 32 directly faces the film to be recorded.

The reflecting mirror 32 once correctly positioned will, unless otherwise made to rotate by activating the manipulating knob 42, not come out of position because the fixing rod 38 having an inverted U-shaped resilient piece 37 secured at the bottom end of the support member 33 remains engaged with the cutoffs 42 formed on the guide aperture 41 as shown in FIG. 11.

The legs 43 and 43' are unfolded from the underside of the case body 1 until the upper portions of the center plate are halted by a pair of blocking protrusions 45 formed on both ends of the underside of the case body 1 and permit the case body 1 to remain still and stationary.

A wide variety of different transfers are possible using different kinds of filters 7. This is done by providing an oblong aperture on each of the left and right side frame members of the lens mount 2.

A filter case 8 mounted with a plurality of filters 7 is inserted into the oblong apertures 9 by pushing or pulling action until the filters of the operator's choice is in a proper position and corresponds to the lens by the engagement of a resilient piece 8' of L-shape tongue formed at the lower edge of the filter case 8 with the recess 2' formed at the center on the lower portion of the lens mount 2.

As described above, a film-to-tape transfer apparatus according to the present invention is simple in operation and has a variety of practical, applicable features and functions such as the selected use of a plurality of filters in a case, adjustment of photo mount according to the size of the photograph to be recorded, accurate rotation of reflective mirror and a firmly secured stand for the apparatus.

While a specific embodiment of the present invention has been illustrated and described herein, it is realized that numerous modifications will occur to those skilled in art. It is therefore to be understood that the appended claims are intended to cover all such modification and changes as falling within the true spirit and scope of the invention.

What is claimed is:

1. A film-to-tape transfer apparatus comprising:

a case body having a lens mount, a glass screen mount and a photo mount;

a control panel disposed on a side of said case body, for controlling input audio and video signals to be transferred;

a filter case aperture forming a hollow aperture through said lens mount; and a adjustable reflecting mirror located inside the case body, the reflecting mirror being used to reflect an image projected from the glass mount through the lens mount, the reflecting mirror having a manipulating knob extending outside of the case body;

wherein a filter case loaded with a plurality of filters is inserted into said filter case aperture, the filter case having a plurality of U-shaped indentations on an upper peripheral edge of the filter case and a plurality of L-shaped tongues on a lower peripheral edge of the filter case for engagement with the filter case aperture.

2. A film-to-tape transfer apparatus comprising:

a case body having a lens mount, a glass screen mount and a photo mount;

a control panel disposed on a side of the case body, for controlling input audio and video signals to be transferred;

a filter case aperture forming a hollow aperture through the lens mount;

a reflecting adjustable mirror located inside the case body, the reflecting mirror having a manipulating knob extending outside of the case body; and a receiving and processing means for transferring the video signals to the tape, wherein the receiving and processing means has:

a color selection circuit for trapping and passing through a color burst component of the video signals to form a black-and-white image and a color image, wherein the color selection circuit includes:

a two-position color selection switch, having a first position and a second position;

a capacitor connected in parallel with the color selection switch; and an inductor connected in parallel with the capacitor and the color selection switch;

wherein when the color selection switch is in the first position, the video signal input to the color selection circuit passes through the color selection switch and does not pass through the capacitor and the inductor, and when the color selection switch is in the second position, the video signal passes through the capacitor and the inductor and does not pass through the color selection switch, and wherein the color burst component of the video signals is trapped by the capacitor and the inductor when the color selection switch is in the second position, and wherein the color burst component of the video signals passes through the color selection circuit when the color selection switch is in the first position.

3. The film-to-tape transfer apparatus as recited in claim 2, wherein said color selection switch can be set to one of the first or second position on the control panel.

* * * * *